United States Patent
Scheepens (10) Patent No.: US 12,399,480 B2
(45) Date of Patent: Aug. 26, 2025

(54) AUTOMATICALLY ASSIGNING NATURAL LANGUAGE LABELS TO NON-CONFORMING BEHAVIOR OF PROCESSES

(71) Applicant: UiPath, Inc., New York, NY (US)

(72) Inventor: Roeland Johannus Scheepens, Eindhoven (NL)

(73) Assignee: UiPath, Inc., New York, NY (US)

( * ) Notice: Subject to any disclaimer, the term of this patent is extended or adjusted under 35 U.S.C. 154(b) by 501 days.

(21) Appl. No.: 17/456,891

(22) Filed: Nov. 30, 2021

(65) Prior Publication Data
US 2023/0168656 A1 Jun. 1, 2023

(51) Int. Cl.
*G06F 40/40* (2020.01)
*G05B 19/406* (2006.01)

(52) U.S. Cl.
CPC ........ *G05B 19/406* (2013.01); *G06F 40/40* (2020.01); *G05B 2219/33051* (2013.01)

(58) Field of Classification Search
None
See application file for complete search history.

(56) References Cited

U.S. PATENT DOCUMENTS

| | | | |
|---|---|---|---|
| 6,304,912 B1 * | 10/2001 | Oguchi | H04L 12/5601 709/227 |
| 6,594,698 B1 * | 7/2003 | Chow | G06F 9/5022 709/219 |
| 6,901,048 B1 * | 5/2005 | Wang | H04L 45/02 370/216 |
| 7,543,020 B2 * | 6/2009 | Walker | G06F 15/173 718/105 |
| 9,530,113 B2 | 12/2016 | Charif et al. | |
| 9,973,442 B1 * | 5/2018 | Kim | H04L 49/101 |
| 10,404,526 B2 | 9/2019 | Prabhakara et al. | |
| 10,423,624 B2 | 9/2019 | Simhon et al. | |
| 10,467,539 B2 | 11/2019 | Li et al. | |
| 11,151,320 B1 * | 10/2021 | Taylor | G06F 40/279 |

(Continued)

FOREIGN PATENT DOCUMENTS

| | | | | |
|---|---|---|---|---|
| WO | WO-2005013070 A2 * | 2/2005 | | G05B 17/02 |
| WO | WO-2005043300 A2 * | 5/2005 | | G06F 11/3684 |

(Continued)

OTHER PUBLICATIONS

Rozinat "Process mining : Conformance and extension", , Proefschrift, pp. 1-393 (Year: 2010).*

(Continued)

*Primary Examiner* — Romain Jeanty
(74) *Attorney, Agent, or Firm* — Chiesa Shahinian & Giantomasi PC (57) ABSTRACT

Systems and methods for automatically assigning labels to one or more types of non-conforming behavior of execution of a process are provided. An aligned process defining non-conforming behavior of execution of a process is received. One or more types of the non-conforming behavior of the execution of the process is identified from the aligned process. Labels identifying the one or more types are assigned to the non-conforming behavior. The labels assigned to the non-conforming behavior are output.

13 Claims, 10 Drawing Sheets

(56) References Cited

U.S. PATENT DOCUMENTS

| | | | |
|---|---|---|---|
| 2009/0144411 A1* | 6/2009 | Winkler | H04L 41/12 |
| | | | 709/224 |
| 2010/0005513 A1* | 1/2010 | Bradley | G06F 16/951 |
| | | | 718/1 |
| 2010/0094981 A1* | 4/2010 | Cordray | H04L 63/0227 |
| | | | 709/224 |
| 2012/0089435 A1* | 4/2012 | Ehben | G05B 17/02 |
| | | | 705/7.27 |
| 2013/0035976 A1* | 2/2013 | Buffett | G06F 17/40 |
| | | | 705/7.26 |
| 2013/0095864 A1* | 4/2013 | Marovets | G06Q 30/0239 |
| | | | 455/466 |
| 2014/0047445 A1 | 2/2014 | Roy et al. | |
| 2015/0066816 A1* | 3/2015 | Charif | G06N 5/02 |
| | | | 706/11 |
| 2016/0085584 A1* | 3/2016 | Pedersen | G06N 5/02 |
| | | | 718/102 |
| 2016/0147548 A1* | 5/2016 | Itsumi | G06F 9/5083 |
| | | | 718/1 |
| 2019/0164091 A1* | 5/2019 | Schnittger | G06Q 10/0633 |
| 2020/0396231 A1* | 12/2020 | Krebs | H04L 63/1425 |
| 2021/0200574 A1 | 7/2021 | Scheepens et al. | |
| 2021/0216925 A1 | 7/2021 | Dixit et al. | |

FOREIGN PATENT DOCUMENTS

| | | | | |
|---|---|---|---|---|
| WO | WO-2013170129 A1 * | 11/2013 | | A01K 29/005 |
| WO | WO-2019222725 A1 * | 11/2019 | | G06N 20/00 |

OTHER PUBLICATIONS

Matthias et al (Propagating changes between aligned process models), Aug. 2012 Journal of Systems and Software vol. 85, Issue 8 , pp. 1885-1898 (Year: 2012).*

Bella "Web Semantics: Science, Services and Agents on the World Wide Web" Mar. 2017, School of Mathematical & Computer Sciences Computer Science, p. 1-17 (Year: 2017).*

Oliver et al "Semantic Process Modeling—Design and Implementation of an Ontology-based Representation of Business Processes"., Springer Nature Link, pp. 438-451 (Year: 2009).*

Garcia-Bañuelos et et., "Complete and Interpretable Conformance Checking of Business Processes," 2017, IEEE Transactions on Software Engineering, 28 pgs.

Maggi et al., "Explaining Non-compliance of Business Process Models Through Automated Planning," 2018, 16th International Conference, ICSOC 2018, 15 pgs.

* cited by examiner

| Activity | Time Stamp | Case ID |
|---|---|---|
| A | 14:00:32 | 1 |
| B | 14:03:04 | 1 |
| D | 14:03:05 | 1 |
| C | 14:04:40 | 1 |
| E | 14:05:22 | 1 |
| F | 14:06:04 | 1 |

AUTOMATICALLY ASSIGNING NATURAL LANGUAGE LABELS TO NON-CONFORMING BEHAVIOR OF PROCESSES

TECHNICAL FIELD

The present invention relates generally to process mining, and more particularly to automatically assigning natural language labels to non-conforming behavior in processes.

BACKGROUND

Processes are sequences of activities executed by one or more computers to perform various tasks. In process mining, conformance checking is performed to evaluate whether the actual execution of the process conforms to the expected execution of the process. Conventionally, conformance checking is performed by manually comparing an event log representing the actual execution of the process with a process model representing the expected execution of the process. However, such conventional conformance checking is a time-consuming and labor-intensive process.

BRIEF SUMMARY OF THE INVENTION

In accordance with one or more embodiments, systems and methods for automatically assigning labels to one or more types of non-conforming behavior of execution of a process are provided. An aligned process defining non-conforming behavior of execution of a process is received. One or more types of the non-conforming behavior of the execution of the process is identified from the aligned process. Labels identifying the one or more types are assigned to the non-conforming behavior. The labels assigned to the non-conforming behavior are output. In one embodiment, the process is an RPA (robotic process automation) process.

In one embodiment, the labels are generated according to a standardized format to identify the one or more types of non-conforming behavior. The labels assigned to the one or more types of the non-conforming behavior may be displayed with the aligned process.

In one embodiment, a non-conforming skipped activity is identified in the aligned process where the activity has an outgoing log-only path and an outgoing model-only path. The outgoing log-only path occurs in an event log of the process as outgoing from the activity but does not occur in a process model of the process and the outgoing model-only path occurs in a process model of the process as outgoing from the activity but does not occur in the event log. In another embodiment, a non-conforming repeated activity in the aligned process is identified where the activity has a model-only edge that is both outgoing and incoming. The model-only edge occurs in a process model of the process but does not occur in an event log of the process. In another embodiment, a non-conforming loop back to an earlier point in the aligned process is identified where a node of the aligned process has an outgoing log-only edge to a previously traversed node. The outgoing log-only edge occurs in an event log of the process but does not occur in a process model of the process.

In one embodiment, the non-conforming behavior is identified as being a block comprising a sub-process of the aligned process. The labels for the block may be generated according to a standardized format to identify the one or more types of the non-conforming behavior based on a name of an activity in the block.

These and other advantages of the invention will be apparent to those of ordinary skill in the art by reference to the following detailed description and the accompanying drawings.

DETAILED DESCRIPTION

Figure 1:
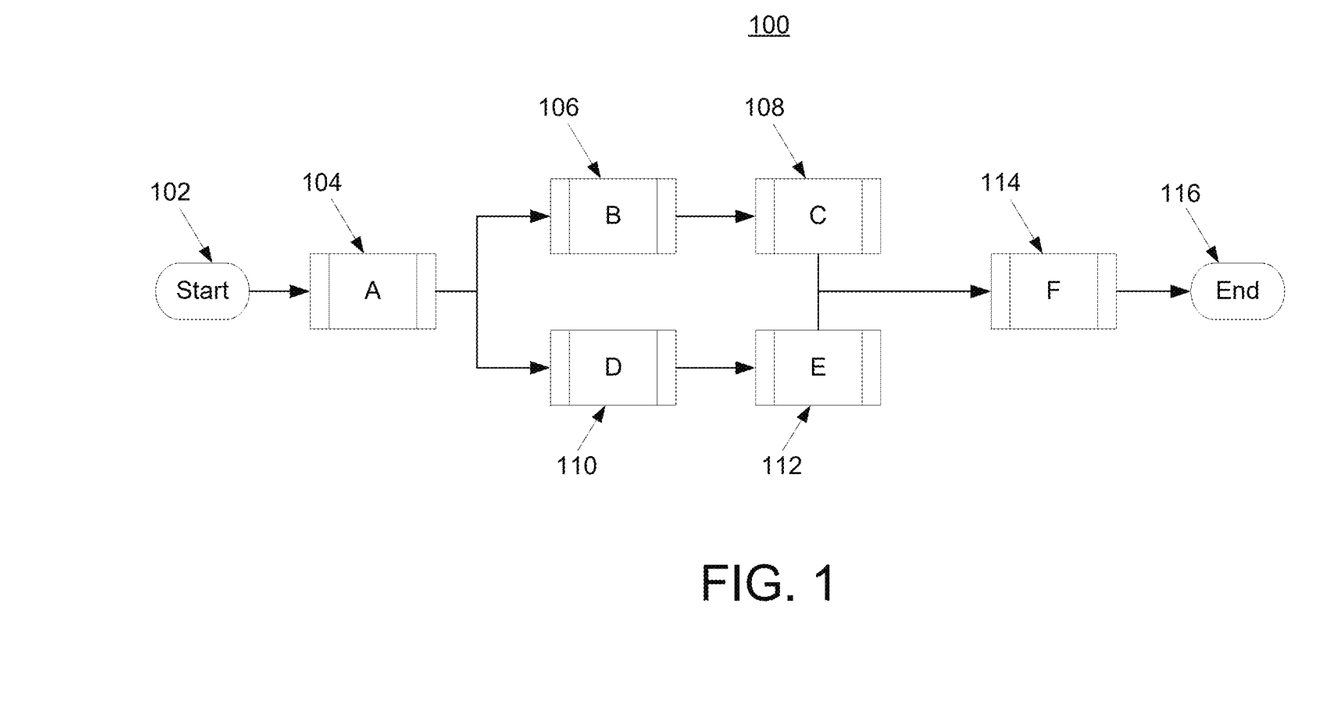
FIG. 1 shows an illustrative process on which conformance checking may be performed in accordance with one or more embodiments.

FIG. 1 shows an illustrative process 100 on which conformance checking may be performed, in accordance with one or more embodiments. Process 100 may be applied to perform any suitable task, such as, e.g., document processing. In one embodiment, process 100 may be implemented as an RPA (robotic process automation) process for automatically performing a task using one or more RPA robots. However, it should be understood that process 100 may be any suitable process that can be modelled as a workflow, such as, e.g., a business workflow.

Process 100 comprises activities 102-116, which represent predefined steps in process 100. As shown in FIG. 1, process 100 is modeled as a directed graph where each activity 102-116 is represented as a node and each transition between activities 102-116 is represented as edges linking the nodes. The transition between activities represents the execution of process 100 from a source activity to a destination activity. Process 100 starts at start activity 102 and proceeds to activity A 104. Process 100 then proceeds, in parallel, to a first branch comprising activity B 106 and activity C 108 and a second branch comprising activity D 110 and activity E 112. Process 100 then proceeds to activity F 114 and ends at end activity 116. Execution of process 100 is recorded as an event log. Each event of the event log refers to the execution of an activity for a certain case at a certain point in time. The event may be represented as a tuple comprising an activity, a case identifier, and a time stamp. Expected execution of process 100 is modelled as a process model.

In process mining, conformance checking is performed on, e.g., process 100 to evaluate whether actual execution of process 100 (as identified in the event log) conforms to the expected execution of process 100 (as identified in the process model). In accordance with embodiments of the present invention, types of non-conforming behavior of the execution of process 100 are automatically assigned natural language labels. Advantageously, such automatic assignment of natural language labels to the types of non-conforming behavior facilitates user understanding and analysis of the non-conforming behavior.

Figure 2:
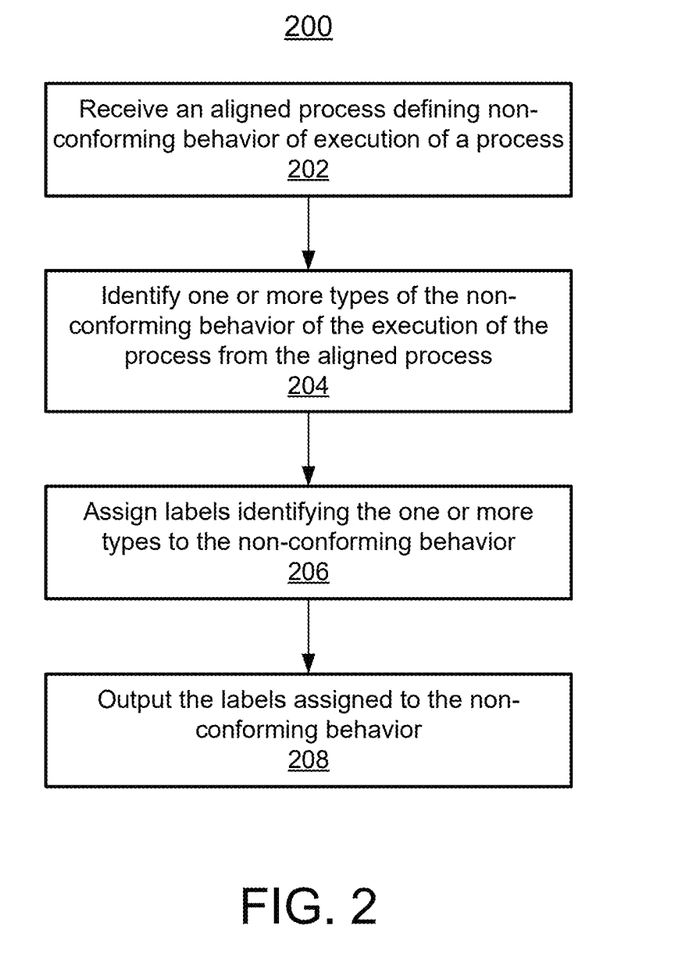
FIG. 2 shows a method for automatically assigning natural language labels to one or more types of non-conforming behavior of a process, in accordance with one or more embodiments.

FIG. 2 shows a method 200 for automatically assigning natural language labels to one or more types of non-conforming behavior of a process, in accordance with one or more embodiments. Method 200 may be performed by one or more suitable computing devices, such as computer 900 of FIG. 9.

Figure 4:
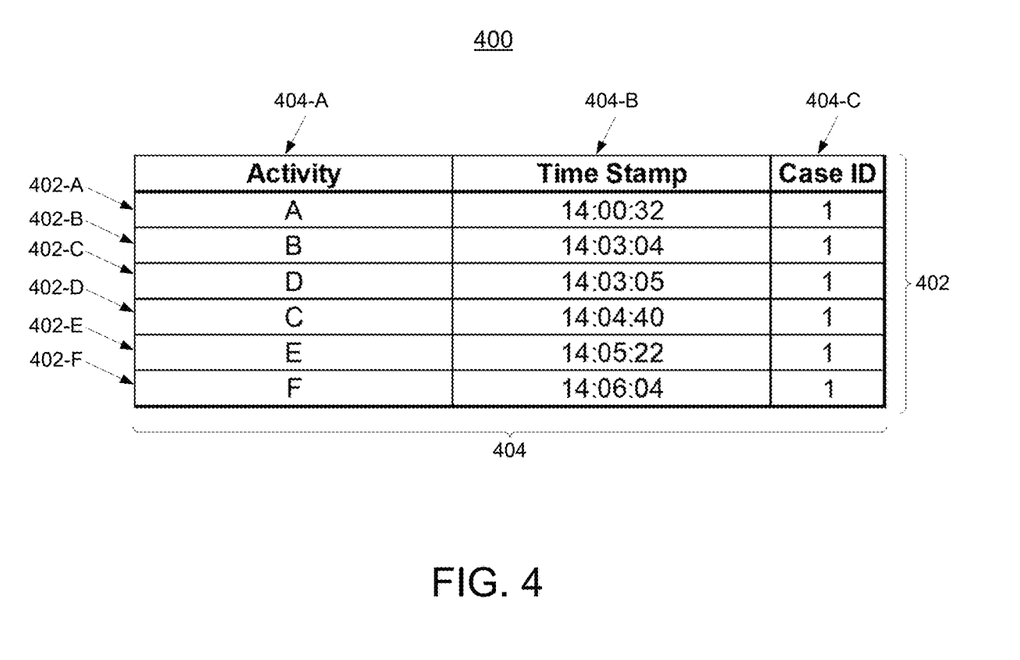
FIG. 4 shows an exemplary event log of a process, in accordance with one or more embodiments.
Figure 5:
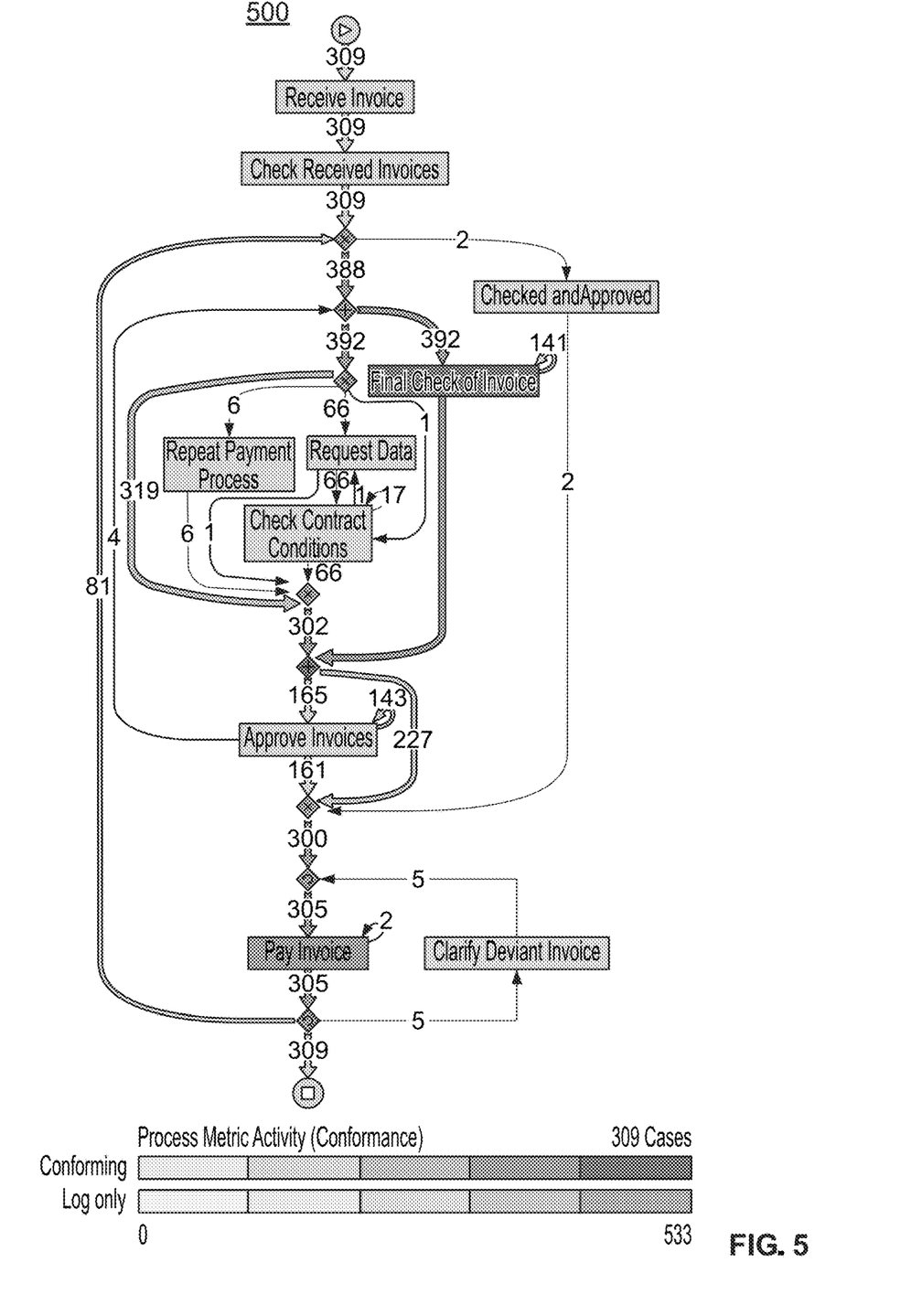
FIG. 5 shows an exemplary aligned process, in accordance with one or more embodiments.

At step 202 of FIG. 2, an aligned process defining non-conforming behavior of execution of a process is received. As used herein, non-conforming behavior refers to actual behavior of a process that does not conform to the expected behavior of the process. The aligned process may have been generated based on an event log representing actual execution of the process and a process model representing expected execution of the process by aligning the event log to the process model. Generation of an aligned process is further described in U.S. Patent Application Publication No. 2021/0200574, entitled "Visual Conformance Checking of Processes," filed Dec. 30, 2019, the disclosure of which is incorporated herein by reference in its entirety. An exemplary process model is shown in FIG. 3, an exemplary event log is shown in FIG. 4, and exemplary aligned process is shown in FIG. 5, which are described in detail below.

The aligned process may be received by loading the aligned process from a storage or memory of a computer system or by receiving the aligned process from a remote computer system. In one example, the process is process 100 of FIG. 1. In one embodiment, the process is an RPA process automatically executed by one or more RPA robots.

Figure 3:
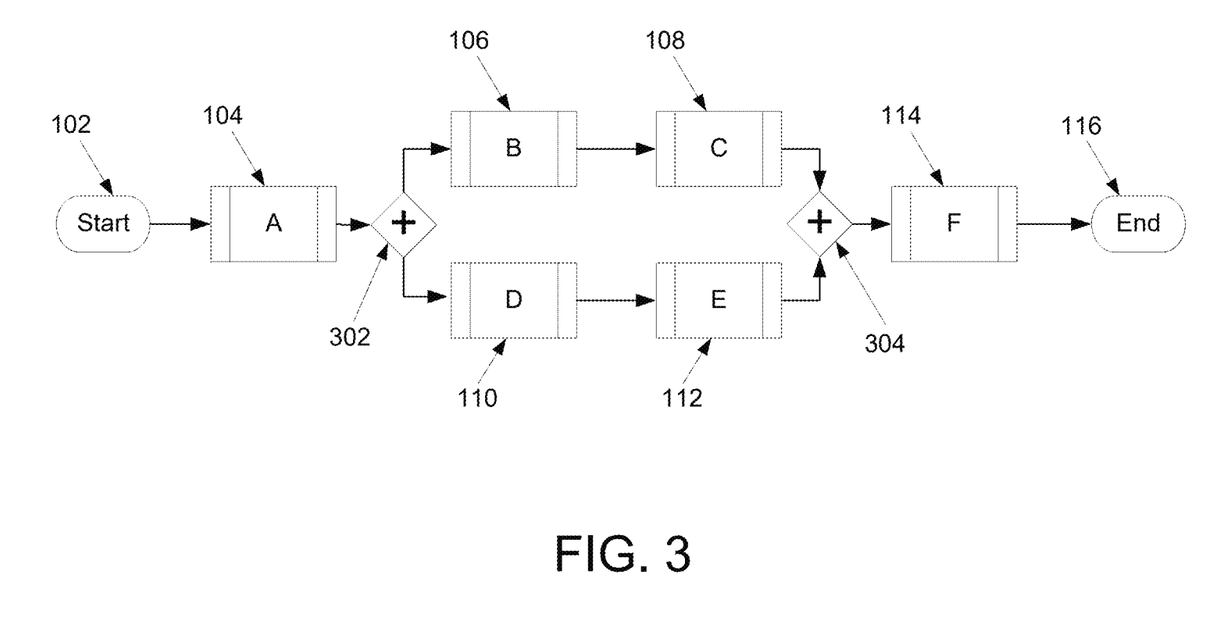
FIG. 3 shows an exemplary process model, in accordance with one or more embodiments.

FIG. 3 shows an exemplary process model 300, in accordance with one or more embodiments. Process model 300 represents expected execution of process 100 of FIG. 1. Process model 300 is modelled as directed graph where each activity of the process is represented as a node and the execution of the process from a source activity to a destination activity is represented as an edge connecting the nodes representing the source activity and the destination activity. Each edge in process model 300 is associated with a number representing a frequency of execution of that edge.

Process model 300 models expected execution of process 100 using gateways to represent diversions in process 100. The gateways control how the process flows during execution. Gateways are represented in process model 300 as gateway nodes. For example, gateway nodes, shown in FIG. 3 as diamond-shaped nodes identified with a "+", may represent parallel relationships. Process model 300 may also comprise gateway nodes representing other types of relationships, such as, e.g., exclusive choice relationships, looping relationships, sequential relationships, etc. As shown in FIG. 3, parallel split gateway 302 represents splitting of the path from activity A 104 into a first path to activity B 106 and a second path to activity D 110 to concurrently execute activity B 106 and activity D 110, and parallel join gateway 304 represents the joining of a first path from activity C 108 and a concurrent second path from activity E 112 into a single path to activity F 114.

FIG. 4 shows an exemplary event log 400 of a process, in accordance with one or more embodiments. Event log 400 records execution of process 100 of FIG. 1 and will be described with reference to FIG. 1. Event log 400 is formatted as a table having rows 402 and columns 404. As shown in FIG. 4, rows 402 of event log 400 comprises rows 402-A through 402-F, each corresponding to an event defining execution of a respective activity 104-114, with a particular time stamp and with a particular case identifier. Event log 400 may also include rows 402 for start activity 102 and end activity 116 in some embodiments. Columns 404 of event log 400 comprises column 404-A identifying the activity, column 404-B identifying the time stamp, and column 404-C identifying the case identifier. Columns 404 may include additional columns identifying additional attributes of activities.

FIG. 5 shows an exemplary aligned process 500 of a process, in accordance with one or more embodiments. Aligned process 500 comprises aligned events and transitions that represent the actual execution of the process aligned over the process model of the process. Aligned process 500 is modelled as directed graph where each activity of the process is represented as a node and the execution of the process from a source activity to a destination activity is represented as an edge connecting the nodes representing the source activity and the destination activity. Each edge in aligned process 500 is associated with a number representing a frequency of execution of that edge.

When the actual execution of certain paths of the process matches the expected execution of the certain paths of the process, execution of the certain paths of the process is identified in aligned process 500 as being conforming behavior. When the actual execution of certain paths of the process deviates from the expected execution of the certain paths of the process, execution of the certain paths of the process is identified in aligned process 500 as being non-conforming behavior. The non-conforming behavior may be non-conforming log only behavior where paths occur in the event log but not in the process model or the non-conforming behavior may be non-conforming model-only behavior where paths occur in the process model but not in the event log. In one embodiment, aligned process 500 identifies the behavior by color coding the nodes and/or edges of aligned process 500 to identify conforming behavior (e.g., as blue), the non-conforming log-only behavior (e.g., as orange), and the non-conforming model-only behavior (e.g., as green).

At step 204 of FIG. 2, one or more types of the non-conforming behavior of the execution of the process are identified from the aligned process. The non-conforming behavior may comprise, for example, non-conforming paths comprising activities, edges, or a sub-process of the process. In one embodiment, the non-conforming behavior may comprise one or more of skipped activities, repeated activities, and loop backs. Other types of non-conforming behavior are also contemplated, such as, e.g., out of order performance of activities, violation of exclusive relationships, performing (at least parts of) multiple branches in an exclusive block, etc.

In one embodiment, the non-conforming behavior is identified in the aligned process based on rule-based pattern matching. The rule-based pattern matching identifies patterns of log-only and model-only edges.

Figure 6:
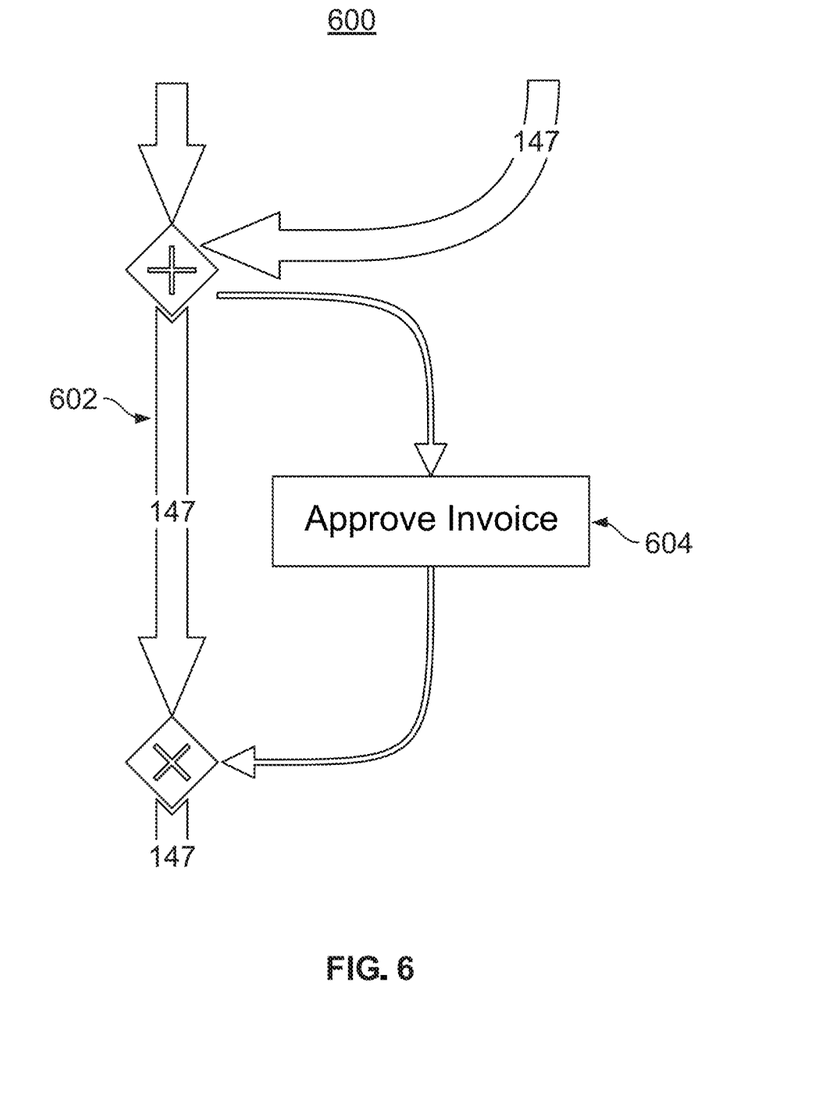
FIG. 6 shows a portion of an aligned process showing non-conforming skipped activity behavior, in accordance with one or more embodiments.

In one embodiment, a non-conforming skipped activity is identified where a particular activity has an outgoing log-only path and an outgoing model-only path The outgoing log-only path is a path (comprising, e.g., one or more edges and/or nodes) that occurs in the event log as outgoing from the particular activity but does not occur in the process model. The outgoing model-only path is a path that occurs in the process model as outgoing from the particular activity but does not occur in the event log. When the particular activity has an outgoing log-only path and an outgoing model-only path, it is assumed that the particular activity is skipped. FIG. 6 shows a portion of an aligned process 600 showing a non-conforming skipped activity, in accordance with one or more embodiments. In aligned process 600, the "approve invoice" activity 604 is skipped during the instances of execution of edges 602.

Figure 7:
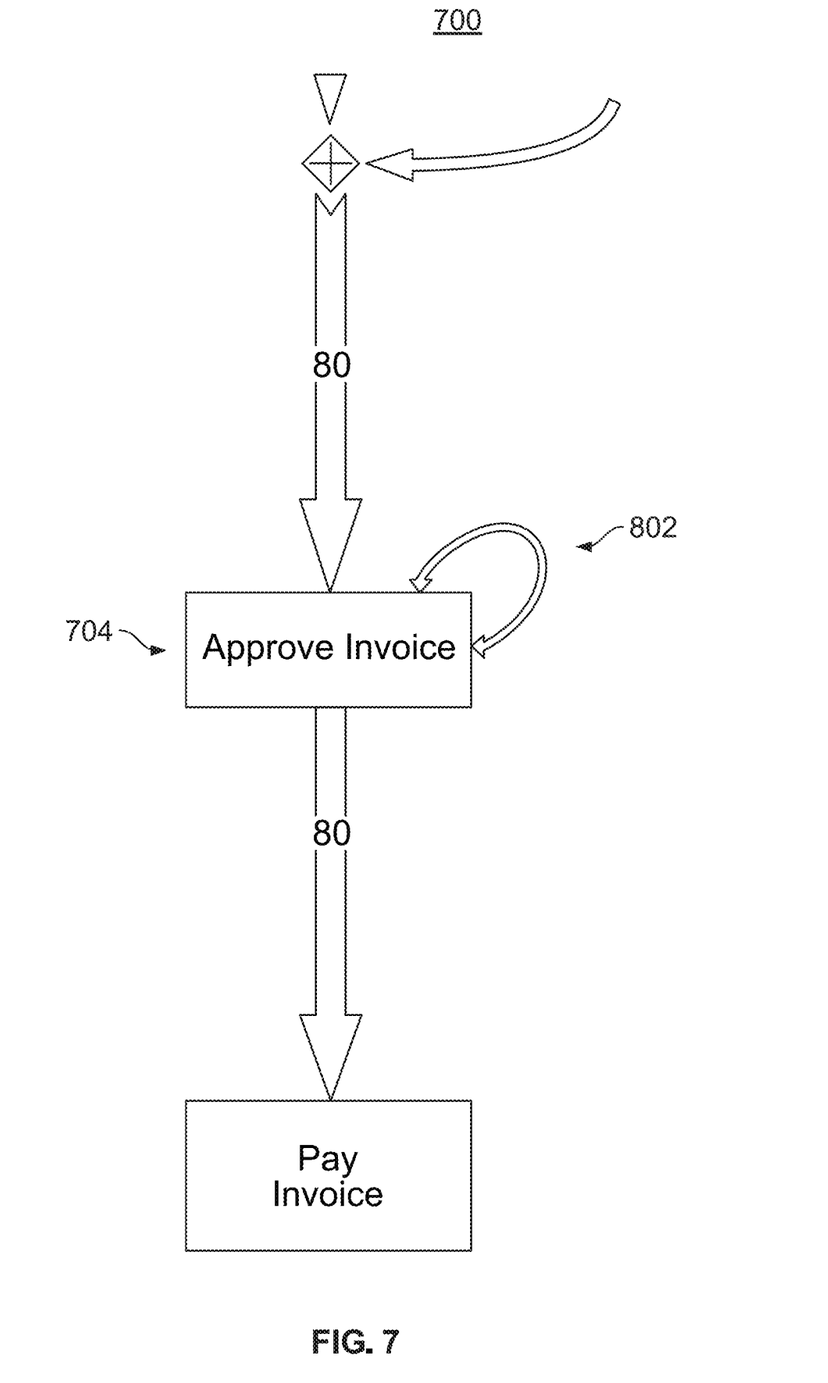
FIG. 7 shows a portion of an aligned process showing non-conforming repeated activities behavior, in accordance with one or more embodiments.

In one embodiment, non-conforming repeated activity behavior is identified where a particular activity has a log-only edge that is both outgoing and incoming, thereby forming a self-loop. The log-only edge is an edge that occurs in the event log but does not occur in the process model. FIG. 7 shows a portion of an aligned process 700 showing non-conforming repeated activities behavior, in accordance with one or more embodiments. In aligned process 700, the "approve invoice" activity 704 is repeated during instances of execution of edges 702.

Figure 8:
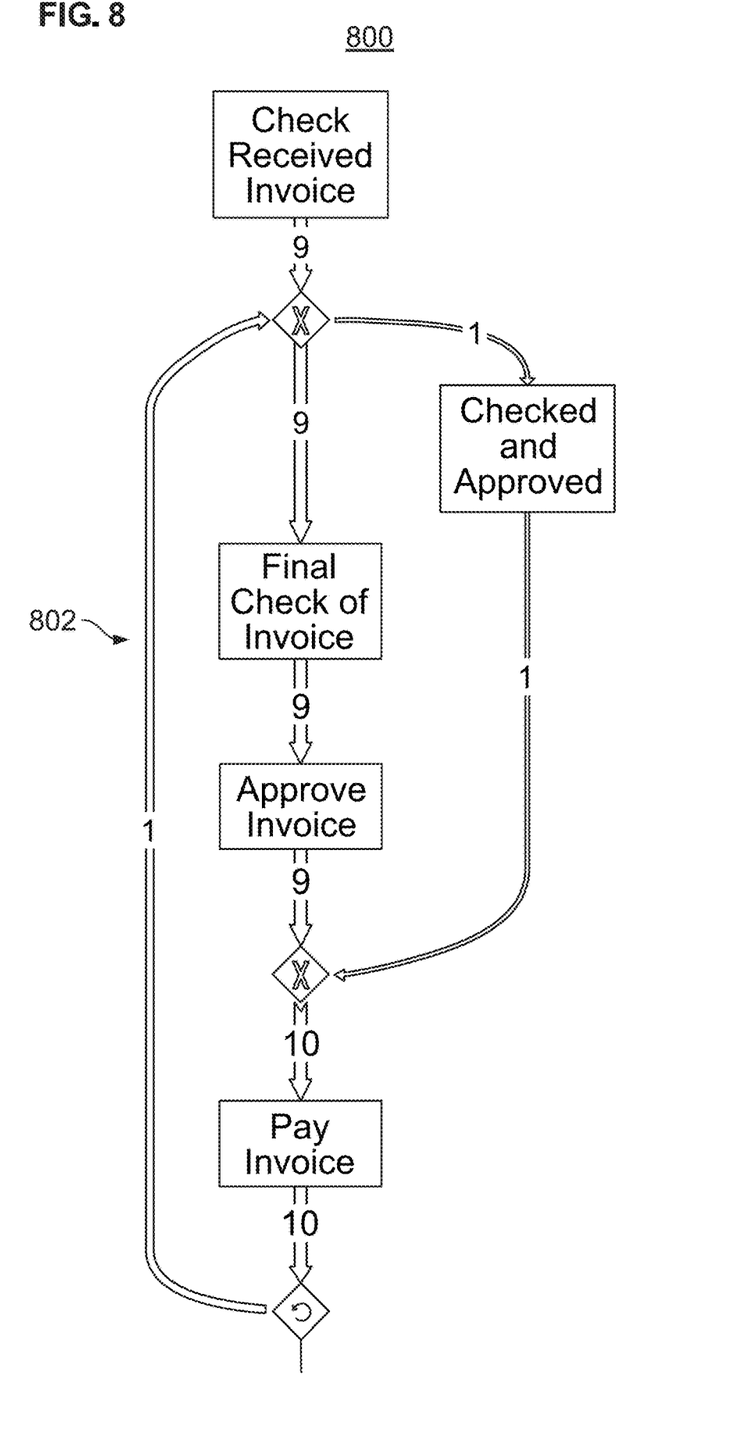
FIG. 8 shows a portion of an aligned process showing non-conforming loop back behavior, in accordance with one or more embodiments.

In one embodiment, non-conforming loop back behavior is identified where a particular node (e.g., a gateway node or an activity node) has an outgoing log-only edge to a node previously traversed during that instance of execution. The outgoing log-only edge is an outgoing edge that occurs in the event log but does not occur in the process model. FIG. 8 shows a portion of an aligned process 800 showing non-conforming loop back behavior, in accordance with one or more embodiments. In aligned process 800, execution of the process loops back to an earlier point in the aligned process 800 and activities are repeated during instances of execution of edges 802.

It should be understood that the identification of non-conforming behavior is not limited to the rule-based pattern matching discussed above. For example, in one embodiment, non-conforming behavior can be identified using pattern recognition techniques for graphs to identify a set of predefined patterns associated with a specific type of non-conforming behavior. In another embodiment, a machine learning based model may be trained to identify non-conforming behavior using non-conformance behavior that has been previously identified. In a further embodiment, the non-conforming behavior can be identified while performing the process alignment to generate the aligned process. The particular approach for identifying non-conforming behavior may be determined based on the type of non-conforming behavior being detected.

At step 206 of FIG. 2, labels identifying the one or more types are assigned to the non-conforming behavior. The labels are natural language labels that allow users to easily identify and explore non-conforming behavior of interest. The labels may be generated using any suitable approach.

In one embodiment, the labels are generated using a standardized format based on the type of the non-conforming behavior to provide natural language labels. For example, where the type of the non-conforming behavior is identified as being a non-conforming skipped activity, the label is generated as: "skipped <name>", where <name> refers to the name of the activity that is skipped. Where the type of the non-conforming behavior is identified as being a non-conforming repeated activity, the label is generated as: "repeating <name>", where <name> refers to the name of the activity that is repeated. Where the type of the non-conforming behavior is identified as being a non-conforming loop back, the label is generated as: "loop back from <name1> to <name2>", where <name1> refers to the name of the from-activity and <name2> refers to the name of the to-activity. If the type of the non-conforming behavior cannot be determined (e.g., where the rules for identifying the types of the non-conforming behavior do not cover all possible non-conforming behavior or where the machine learning model cannot recognize all non-conforming behavior), a label of "unknown non-conforming behavior" label is assigned to the non-conforming behavior. As such, labels are assigned to all non-conforming behavior. Only fully conforming behavior have no labels.

In many cases, the non-conforming behavior is not limited to a single activity or node but may comprise a block comprising a sub-process of the process. To assign labels to such blocks, the block hierarchy of the process tree of the process is utilized, which may be derived from the process model during process alignment. A standardized format based on a type of behavior in the block is provided to generate a label of the block as follows: "<type> block containing <name>", where <type> is a type of behavior in the block (e.g., parallel) and <name> is a name of any activity in the block. For some processes (or process apps), it is desirable to assign process-specific names to the blocks, which can be done at the app-level. In some embodiments, blocks may be manually labeled by a user.

At step 208 of FIG. 2, the labels assigned to the non-conforming behavior are output. In one embodiment, the labels are output by displaying the labels to a user on a display device, thereby facilitating selection and exploration of non-conforming behavior of interest by a user. In other embodiments, the labels may be output by, for example, storing the labels on a memory or storage of a computer system or by transmitting the labels to a remote computer system.

Figure 9:
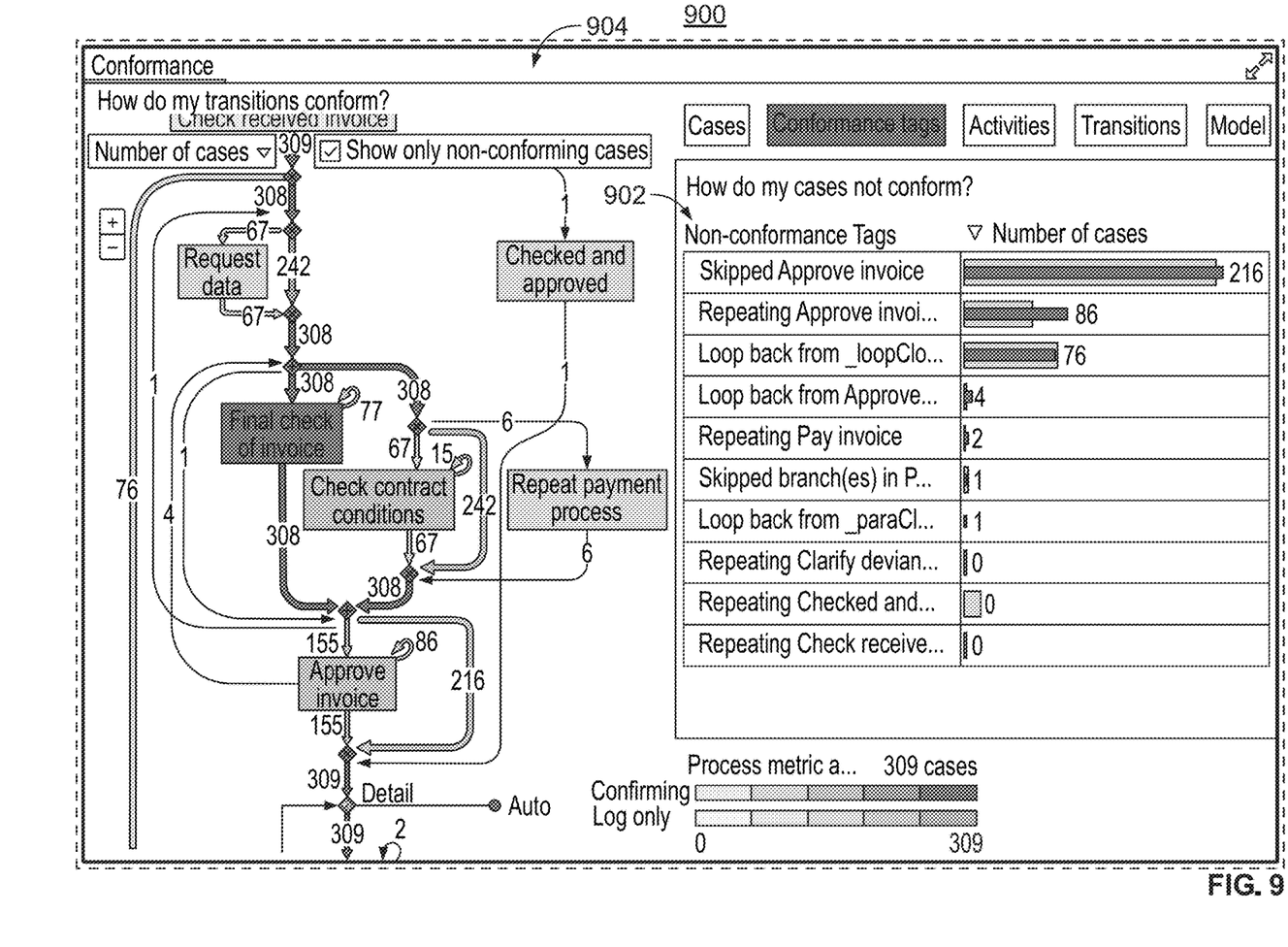
FIG. 9 shows an exemplary user interface presenting labels assigned to types of non-conforming behavior, in accordance with one or more embodiments.

FIG. 9 shows an exemplary user interface 900 presenting labels assigned to non-conforming behavior, in accordance with one or more embodiments. The assigned labels may have been assigned according to method 200 of FIG. 2. As shown in FIG. 9, an aligned process 904 is shown with a table 902 listing labels identifying types of non-conforming behavior of aligned process 904 in a first row and a corresponding number of cases in a second row. In user interface 900, a user can select (e.g., by clicking) on the labels, which will select all cases that are assigned to the selected label. The user can then further explore this selection and perform root-cause analysis to find out what may cause these deviations to occur. Advantageously, the labels identifying a type of non-conforming behavior enable the user to select and explore non-conforming behavior of interest of process 902.

Figure 10:
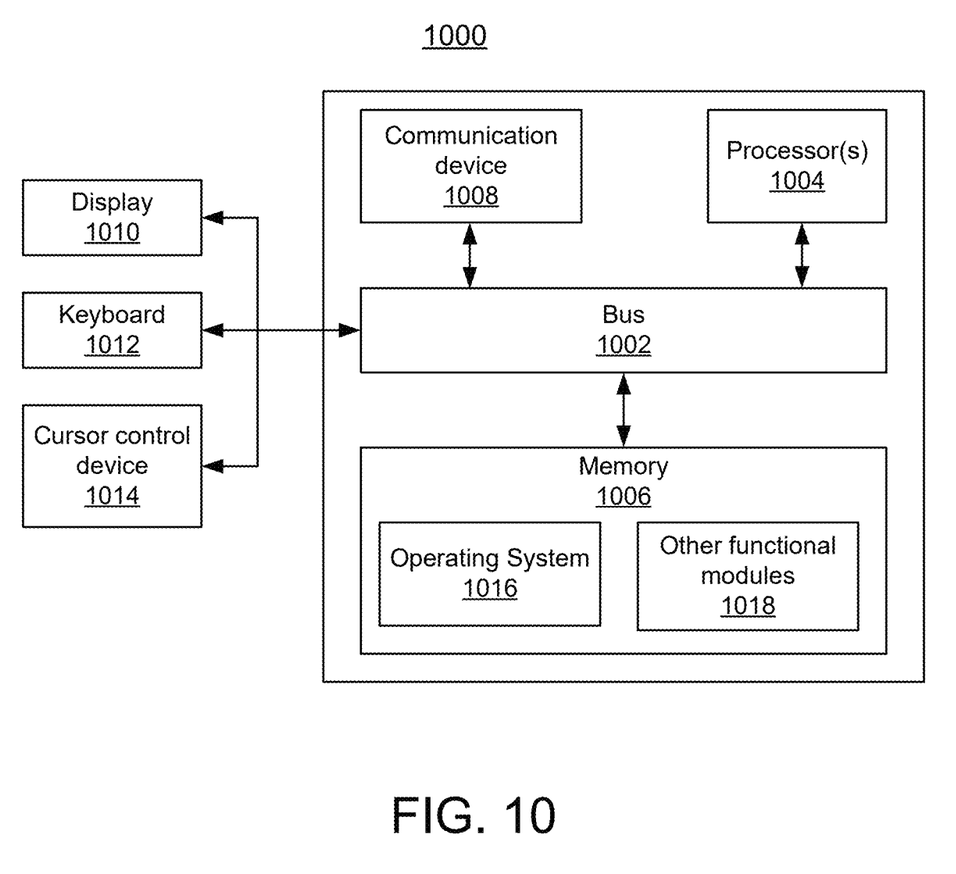
FIG. 10 is a block diagram of a computing system according to an embodiment of the invention.

FIG. 10 is a block diagram illustrating a computing system 1000 configured to execute the methods, workflows, and processes described herein, including FIG. 2, according to an embodiment of the present invention. In some embodiments, computing system 1000 may be one or more of the computing systems depicted and/or described herein. Computing system 1000 includes a bus 1002 or other communication mechanism for communicating information, and processor(s) 1004 coupled to bus 1002 for processing information. Processor(s) 1004 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1004 may also have multiple processing cores, and at least some of the cores may be configured to perform specific functions. Multi-parallel processing may be used in some embodiments.

Computing system 1000 further includes a memory 1006 for storing information and instructions to be executed by processor(s) 1004. Memory 1006 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1004 and may include volatile media, non-volatile media, or both. The media may also be removable, non-removable, or both.

Additionally, computing system 1000 includes a communication device 1008, such as a transceiver, to provide access to a communications network via a wireless and/or wired connection according to any currently existing or future-implemented communications standard and/or protocol.

Processor(s) 1004 are further coupled via bus 1002 to a display 1010 that is suitable for displaying information to a user. Display 1010 may also be configured as a touch display and/or any suitable haptic I/O (input/output) device.

A keyboard 1012 and a cursor control device 1014, such as a computer mouse, a touchpad, etc., are further coupled to bus 1002 to enable a user to interface with computing system. However, in certain embodiments, a physical keyboard and mouse may not be present, and the user may interact with the device solely through display 1010 and/or a touchpad (not shown). Any type and combination of input devices may be used as a matter of design choice. In certain embodiments, no physical input device and/or display is present. For instance, the user may interact with computing system 1000 remotely via another computing system in communication therewith, or computing system 1000 may operate autonomously.

Memory 1006 stores software modules that provide functionality when executed by processor(s) 1004. The modules include an operating system 1016 for computing system 1000 and one or more additional functional modules 1018 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
  executing, by one or more computing devices, an RPA (robotic process automation) process by one or more RPA robots to generate an event log of the execution;
  receiving, by the one or more computing devices, an aligned process comprising events and transitions, representing actual execution of the RPA process as identified in the event log, that are aligned over a process model representing expected execution of the RPA process, the aligned process defining behavior of the actual execution that is non-conforming to the process model;
  identifying, by the one or more computing devices, one or more types of the non-conforming behavior of the actual execution of the RPA process from the aligned process;
  assigning, by the one or more computing devices, natural language labels identifying the one or more types to the non-conforming behavior using a standardized format based on 1) the one or more types of the non-conforming behavior and 2) names of one or more activities of the RPA process that are non-conforming;

displaying, by the one or more computing devices, the aligned process with the natural language labels assigned to the non-conforming behavior on a display device;

receiving, by the one or more computing devices, user input of a selection of one of the natural language labels via the display device; and in response to the user input, automatically selecting, by the one or more computing devices, cases having the non-conforming behavior assigned to the selected natural language label.

2. The computer-implemented method of claim 1, wherein identifying, by the one or more computing devices, one or more types of the non-conforming behavior of the actual execution of the RPA process from the aligned process comprises:

identifying a non-conforming skipped activity in the aligned process where the activity has an outgoing log-only path and an outgoing model-only path, wherein the outgoing log-only path occurs in an event log of the RPA process as outgoing from the activity but does not occur in a process model of the RPA process, and wherein the outgoing model-only path occurs in the process model as outgoing from the activity but does not occur in the event log.

3. The computer-implemented method of claim 1, wherein identifying, by the one or more computing devices, one or more types of the non-conforming behavior of the actual execution of the RPA process from the aligned process comprises:

identifying a non-conforming repeated activity in the aligned process where the activity has a model-only edge that is both outgoing and incoming, wherein the model-only edge occurs in a process model of the RPA process but does not occur in an event log of the RPA process.

4. The computer-implemented method of claim 1, wherein identifying, by the one or more computing devices, one or more types of the non-conforming behavior of the actual execution of the RPA process from the aligned process comprises:

identifying a non-conforming loop back to an earlier point in the aligned process where a node of the aligned process has an outgoing log-only edge to a previously traversed node, wherein the outgoing log-only edge occurs in an event log of the RPA process but does not occur in a process model of the RPA process.

5. The computer-implemented method of claim 1, wherein identifying, by the one or more computing devices, one or more types of the non-conforming behavior of the actual execution of the RPA process from the aligned process comprises:

identifying the non-conforming behavior as being a block comprising a sub-process of the aligned process.

6. The computer-implemented method of claim 5, wherein assigning, by the one or more computing devices, natural language labels identifying the one or more types to the non-conforming behavior comprises:

generating the natural language labels for the block according to the standardized format to identify the one or more types of the non-conforming behavior based on names of the one or more activities in the block.

7. An apparatus comprising:
a memory storing computer instructions; and
at least one processor configured to execute the computer instructions, the computer instructions configured to cause the at least one processor to perform operations of:

executing an RPA (robotic process automation) process by one or more RPA robots to generate an event log of the execution;

receiving an aligned process comprising events and transitions, representing actual execution of the RPA process as identified in the event log, that are aligned over a process model representing expected execution of the RPA process, the aligned process defining behavior of the actual execution that is non-conforming to the process model;

identifying one or more types of the non-conforming behavior of the actual execution of the RPA process from the aligned process;

assigning natural language labels identifying the one or more types to the non-conforming behavior using a standardized format based on 1) the one or more types of the non-conforming behavior and 2) names of one or more activities of the RPA process that are non-conforming;

displaying the aligned process with the natural language labels assigned to the non-conforming behavior on a display device;

receiving user input of a selection of one of the natural language labels via the display device; and in response to the user input, automatically selecting cases having the non-conforming behavior assigned to the selected natural language label.

8. The apparatus of claim 7, wherein identifying one or more types of the non-conforming behavior of the actual execution of the RPA process from the aligned process comprises:

identifying a non-conforming skipped activity in the aligned process where the activity has an outgoing log-only path and an outgoing model-only path, wherein the outgoing log-only path occurs in an event log of the RPA process as outgoing from the activity but does not occur in a process model of the RPA process, and wherein the outgoing model-only path occurs in the process model as outgoing from the activity but does not occur in the event log.

9. The apparatus of claim 7, wherein identifying one or more types of the non-conforming behavior of the actual execution of the RPA process from the aligned process comprises:

identifying a non-conforming repeated activity in the aligned process where the activity has a model-only edge that is both outgoing and incoming, wherein the model-only edge occurs in a process model of the RPA process but does not occur in an event log of the RPA process.

10. The apparatus of claim 7, wherein identifying one or more types of the non-conforming behavior of the actual execution of the RPA process from the aligned process comprises:

identifying a non-conforming loop back to an earlier point in the aligned process where a node of the aligned process has an outgoing log-only edge to a previously traversed node, wherein the outgoing log-only edge occurs in an event log of the RPA process but does not occur in a process model of the RPA process.

11. A non-transitory computer-readable medium storing computer program instructions, the computer program instructions, when executed on at least one processor, cause the at least one processor to perform operations comprising:

executing an RPA (robotic process automation) process by one or more RPA robots to generate an event log of the execution;

receiving an aligned process comprising events and transitions, representing actual execution of the RPA process as identified in the event log, that are aligned over a process model representing expected execution of the RPA process, the aligned process defining behavior of the actual execution that is non-conforming to the process model;

identifying one or more types of the non-conforming behavior of the actual execution of the RPA process from the aligned process;

assigning natural language labels identifying the one or more types to the non-conforming behavior using a standardized format based on 1) the one or more types of the non-conforming behavior and 2) names of one or more activities of the RPA process that are non-conforming;

displaying the aligned process with the natural language labels assigned to the non-conforming behavior on a display device;

receiving user input of a selection of one of the natural language labels via the display device; and in response to the user input, automatically selecting cases having the non-conforming behavior assigned to the selected natural language label.

12. The non-transitory computer-readable medium of claim 11, wherein identifying one or more types of the non-conforming behavior of the actual execution of the RPA process from the aligned process comprises:

identifying the non-conforming behavior as being a block comprising a sub-process of the aligned process.

13. The non-transitory computer-readable medium of claim 12, wherein assigning natural language labels identifying the one or more types to the non-conforming behavior comprises:

generating the natural language labels for the block according to the standardized format to identify the one or more types of the non-conforming behavior based on names of the one or more activities in the block.

* * * * *